United States Patent [19]

Dockner et al.

[11] 3,956,387

[45] May 11, 1976

[54] MANUFACTURE OF CONCENTRATED AQUEOUS (METH)ACRYLAMIDE SOLUTIONS BY CATALYTIC ADDITION OF WATER TO (METH) ACRYLONITRILE

[75] Inventors: Toni Dockner, Meckenheim; Rolf Platz, Mannheim, both of Germany

[73] Assignee: BASF Aktiengesellschaft, Ludwigshafen (Rhine), Germany

[22] Filed: Apr. 10, 1974

[21] Appl. No.: 459,457

[30] Foreign Application Priority Data

Apr. 19, 1973 Germany............................ 2320061

[52] U.S. Cl............................................. 260/561 N
[51] Int. Cl.²........................................ C07C 103/08
[58] Field of Search................................ 260/561 N

[56] References Cited
UNITED STATES PATENTS

| | | | |
|---|---|---|---|
| 3,474,142 | 10/1969 | Darcas et al..................... | 260/561 N |
| 3,624,154 | 11/1971 | Robbins et al................... | 260/561 N |
| 3,679,745 | 7/1972 | Schoenbrunn.................... | 260/561 N |
| 3,696,152 | 10/1972 | Habermann et al............. | 260/561 N |
| 3,758,578 | 9/1973 | Habermann et al............. | 260/561 N |

*Primary Examiner*—C. Davis
*Attorney, Agent, or Firm*—Johnston, Keil, Thompson & Shurtleff

[57] ABSTRACT

By adding water to (meth)acrylonitrile there is formed a concentrated aqueous (meth)acrylamide solution, the addition being effected in the presence of a heterogeneous catalyst at elevated temperature and in aqueous (meth)acrylamide/(meth)acrylonitrile solution at an initial ratio of amide to nitrile of from 1:1 to 1:7.

6 Claims, No Drawings

MANUFACTURE OF CONCENTRATED AQUEOUS (METH)ACRYLAMIDE SOLUTIONS BY CATALYTIC ADDITION OF WATER TO (METH)ACRYLONITRILE

This application discloses and claims subject matter described in German Pat. application No. P 23 20 061.5, filed April 19, 1973, which is incorporated herein by reference.

It is known from U.S. Pat. No. 3,381,034 that carboxamides may be manufactured from nitriles of aliphatic carboxylic acids by the addition of water thereto in the presence of copper(I) and copper (II) salts. German Published application No. 2,001,903 discloses that a catalyst which may be used for such water-addition may be a reduced copper oxide, copper chromic oxide or copper molybdic oxide or mixtures thereof.

German Published application No. 2,036,126 describes a process for the manufacture of an amide in which a nitrile, such as acrylonitrile or methacrylonitrile, has water added thereto catalytically. The catalysts mentioned therein are metal-containing catalysts such as Raney copper, Ullmann copper, reduced copper catalysts, silver, gold, cobalt, nickel, palladium and platinum. According to the Examples given therein, acrylonitrile and water are reacted at elevated temperature in the presence of a heterogeneous catalyst. At conversions of from 5 to 40% of the acrylonitrile, at 70°C, solutions containing not more than 16% of acrylamide are obtained. In Example 1f of German Published application No. 2,036,126 it is stated that somewhat higher conversions and higher concentrations of amide are obtained at temperatures above 100°C and at elevated pressure, but generally the low solubility of the nitrile, e.g. acrylonitrile, in water limits the concentration of amide in the reaction product.

However, solutions containing from 30 to 50% by weight of acrylamide are of industrial interest, because in this form acrylamide can be polymerized without prior working up. It is therefore an object of the present invention to provide a method of manufacturing concentrated aqueous solutions of (meth)acrylamide.

We have now found that concentrated aqueous (meth)acrylamide solutions may be obtained by reacting (meth)acrylonitrile with water in an aqueous solution of (meth)acrylonitrile and (meth)acrylamide at elevated temperature in contact with a heterogeneous catalyst and at an initial ratio of amide to nitrile of from 1:1 to 1:7, by weight, and, if desired, separating unreacted nitrile from the reaction solution. By the initial ratio of amide to nitrile we mean the ratio of these components prior to commencement of the reaction, i.e. before they come into contact the catalyst, e.g. at the reactor inlet. The novel process is of particular interest for the manufacture of acrylamide by adding water to acrylonitrile.

Suitable heterogeneous catalysts, i.e. catalysts which are insoluble or virtually insoluble in the reaction mixture, are those which are commonly used for the addition of water to nitriles, particularly acrylonitrile, for example reduced copper oxide, Raney copper and reduced copper compounds. Catalysts of this type are described in detail, for example, in U.S. Pat. Nos. 3,381,034; 3,631,107; 3,642,894 and 3,658,578, and German Published application No. 2,036,126. The disclosures of these specifications are incorporated herein by reference.

In the novel process, the proportions are generally so selected that acrylamide does not crystallize out under the conditions of the reaction in the presence of the catalyst. This may be achieved, for example, by adding enough acrylamide to a mixture of acrylonitrile and water to ensure that all of the nitrile is dissolved in the aqueous phase at temperatures of from 20° to 70°C. The solution may then be passed over a fixed-bed catalyst, for example at from 40° to 150°C and preferably from 60° to 120°C. In continuous operation, a small stream of the (meth)acrylamide solution may be recycled so as to increase the solubility of the nitrile in water. In this process, the initial ratio of methacrylonitrile and in particular acrylonitrile to water is generally from 1:10 to 1:1 and preferably from 1:6 to 1:2, by weight, this again being the ratio of the components before commencement of the reaction, i.e. before the solution comes into contact the catalyst.

Unreacted acrylonitrile may, for example, be distilled off in a distillation column connected to the reactor. Acrylamide in aqueous solution at concentrations of more than 20% by weight and at temperatures of more than 20°C tends to oligomerize and polymerize. This may be avoided, for example, by keeping the temperature in the distillation column below 80°C and by passing an oxygen-containing gas, in particular air, or oxygen itself into the evaporator of the column. In general, distillation is carried out at a pressure of from $5 \times 10^1$ to $9.81 \times 10^4$ N/m².

It is also advantageous to keep the pH of the concentrated (meth)acrylamide solution during removal of nitrile, for example by distillation, at or above 5, usually at from 5 to 8 and in particular at from 6 to 7.5, for example by adding alkali or, preferably, ammonia. Suitable alkalis or substances having an alkaline reaction are for example sodium hydroxide and potassium hydroxide. The distillate consisting of (meth)acrylonitrile and water may, advantageously together with the fresh feed of reactants, be treated with steam or nitrogen to remove the oxygen dissolved therein, this being advantageously effected, for example, in a column, countercurrently.

The concentrated (meth)acrylamide solution obtained as reaction solution after the optional separation of unreacted acrylonitrile often contains from 20 to 100 ppm of $Cu^{2+}$ ions when reduced copper compounds have been used as catalyst, which copper ions generally inhibit subsequent polymerization. In such a case it is therefore advantageous to cool the reaction solution after optional separation of the unreacted nitrile (for example after withdrawal from an evaporator used for such separation) to temperatures below 20°C and preferably to from −5° to +10°C and to treat it with a conventional acid ion exchanger (an ion exchanger in the H⁺ form), for example one based on polystyrenesulfonic acid.

The process of the invention gives amide solutions which generally contain from 30 to 50% by weight of (meth)acrylamide and which may usually be fed to polymerization reactions without further purification. The homopolymers and copolymers obtainable with other conventional monomers, usually monoolefinically unsaturated monomers, have, when used as flocculating agents, the same action as those polymers which have been manufactured from purified crystalline (meth)acrylamide.

The invention is further illustrated by the following Example in which parts and percentages are by weight.

EXAMPLE

A solution of 106.5 parts/hr of acrylonitrile and 30.2 parts/hr of acrylamide in 269.5 parts/hr of water is passed, at 70°C, upwardly through a stainless steel reactor containing 1,000 parts of a fixed-bed catalyst containing 30% of copper and having the composition given in German Patent No. 869,052. The nitrile and water are previously freed from oxygen in the usual manner by passing steam therethrough. The average residence time of the solution is 2.5 hours, based on the empty reactor.

The mixture leaving the reactor is divided. A liquid stream consisting of 30.2 parts of acrylamide, 7.3 parts of acrylonitrile and 56.1 parts of water is recycled to the reactor where it is combined with the fresh feed of acrylonitrile and water and also with the unreacted acrylonitrile distilled off azeotropically. The main stream, comprising 100 parts of acrylamide, 24.4 parts of acrylonitrile and 188.2 parts of water, is fed to a conventional distillation column, where, at a pressure of $6.4 \times 10^4$ N/m$^2$ and a temperature of 50°C and while introducing air, the unreacted acrylonitrile distils off with water.

The virtually nitrile-free solution is withdrawn from the bottom of the column and cooled to 10°C, adjusted to pH 7 with ammonia and passed upwardly through an ion-exchange column. The column is filled with 120 parts of a commercial acid ion exchanger based on polystyrenesulfonic acid.

There are obtained, per hour, 286 parts of acrylamide solution containing 35% of acrylamide containing from 40 to 80 ppm of impurities.

The conversion is 70%, the yield is virtually 100% and the space-time yield is 333 parts of acrylamide per 1,000 parts of copper per hour.

Comparative Experiment

Water is added to acrylonitrile in a conventional manner using the same catalyst and a reaction temperature of 70°C. The starting material used is an aqueous acrylonitrile solution which is saturated at 70°C; no acrylamide solution is recycled but unreacted acrylonitrile which, as in the Example, is distilled off from the reaction solution is recycled. In this case, after separation of the unreacted acrylonitrile, there is obtained an aqueous acrylamide solution having a concentration of only 11% at a conversion of 50%.

We claim:

1. A process for the manufacture of aqueous solutions of an amide from the group consisting of acrylamide and methacrylamide by the addition of water to acrylonitrile or methacrylonitrile, wherein an aqueous solution containing the said amide and said nitrile in an initial ratio of from 1:1 to 1:7, respectively, is contacted with a conventional heterogeneous catalyst for said addition reaction at a temperature of from 40° to 150°C.

2. A process as claimed in claim 1, wherein unreacted nitrile is separated from the reaction mixture.

3. A process as claimed in claim 1, wherein said aqueous solution of the amide and the nitrile is contacted with the catalyst at a temperature of from 60° to 120°C.

4. A process as claimed in claim 1, wherein the initial ratio of the nitrile to water in the aqueous solution of the amide and the nitrile is from 1:10 to 1:1.

5. A process as claimed in claim 4, wherein unreacted nitrile is separated from the reaction mixture at a pH of from 5 to 8.

6. A process as claimed in claim 1 wherein the resultant aqueous solution of acrylamide or methacrylamide contains 30–50% by weight of acrylamide or methacrylamide.

\* \* \* \* \*